UNITED STATES PATENT OFFICE.

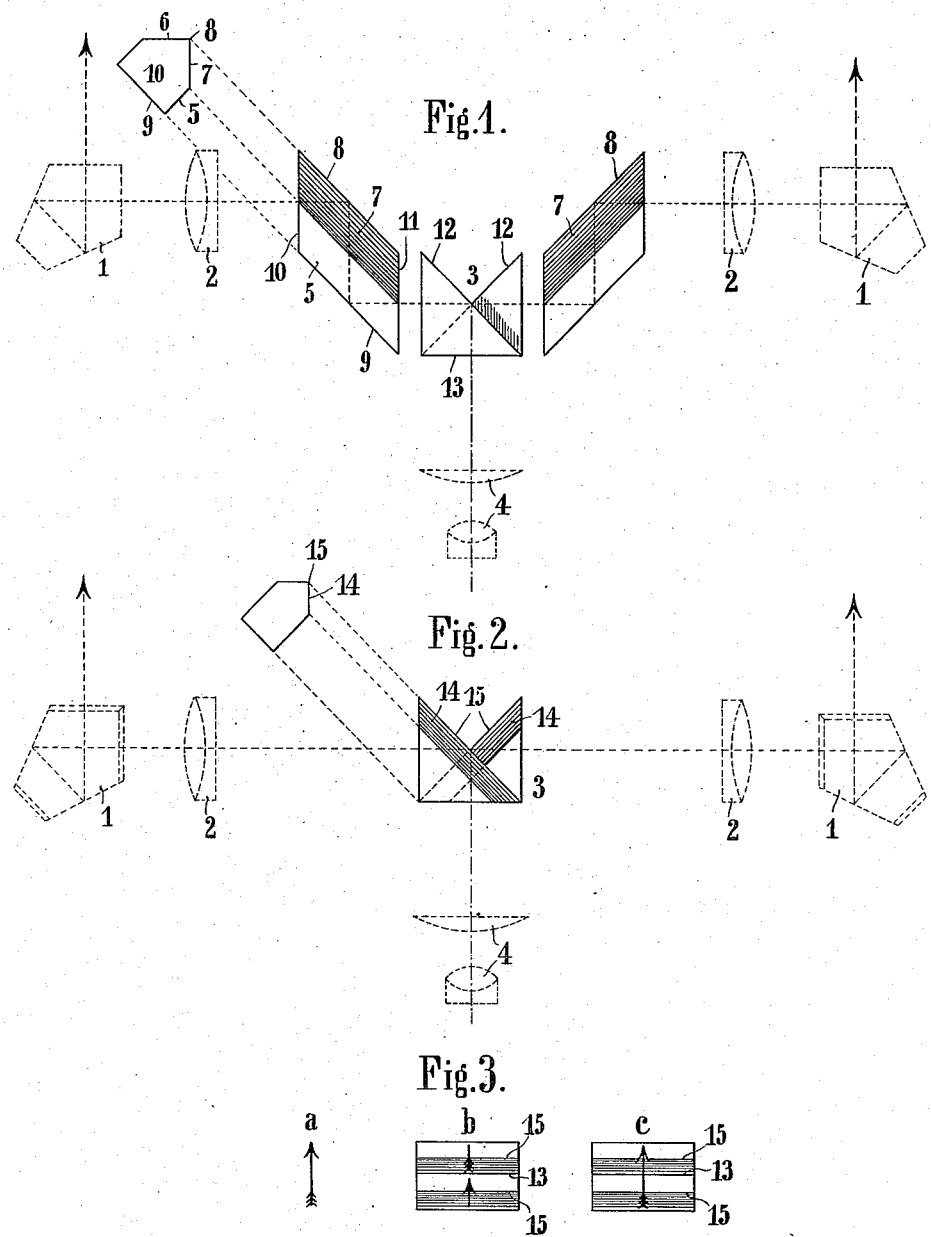

FRIEDRICH DUBENHORST, OF STEGLITZ, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

OPTICAL DISTANCE-MEASURING INSTRUMENT.

941,503. Specification of Letters Patent. Patented Nov. 30, 1909.

Application filed April 7, 1908. Serial No. 425,639.

*To all whom it may concern:*

Be it known that I, FRIEDRICH DUBENHORST, a citizen of the German Empire, and resident of 8a Hubertusstrasse, Steglitz, near Berlin, Germany, engineer, have invented certain new and useful Improvements in Optical Distance-Measuring Instruments, of which the following is a specification.

My present invention relates to an optical distance-measurer provided with two objectives arranged at a distance from each other, one ocular and means adapted to emit the rays entering through said two object-glasses through said one ocular.

The purpose of my invention is to produce a simple instrument giving upright images without lateral reversion in which the axis of the ocular substantially coincides with the plane of the triangle of observation, that is to say with the plane including the two lines of sight running from the ray receiving ends of the instrument to the observed object, so that the observer on using the instrument looks in the direction toward the origin of the rays which meet his eye on leaving the instrument.

I obtain the purpose of invention by a peculiar arrangement of an even number of not less than four reflecting surfaces in the path of the rays coming through each object-glass.

In order that my invention may better be understood I have illustrated it on the accompanying drawing in which—

Figure 1 shows the optical elements of a distance-measurer in accordance with my invention. Fig. 2 shows the instrument with a special form of a uniting-body provided in connection with the instrument. Fig. 3 illustrates the function of the image-uniting body of Fig. 2.

In Fig. 1 I have shown in dotted lines those optical elements which are well known and usual in connection with the kind of distance-measurers; these elements are the two pentaprisms 1 arranged at a distance from each other, this distance forming the base of the instrument, the two object-glasses 2 and the ocular 4. It is furthermore common in the construction of these distance-measurers to provide some image-uniting body consisting of two elements each adapted to bring into the field of view of the ocular an image of an object sending rays to one of said pentaprisms and object-glass, and allowing to bring to coincidence the two images of the same object by suitable adjustment of the instrument. Devices for effecting such adjustment are well known and are not illustrated in the drawings because the same is not necessary for a complete understanding of the present invention.

In the drawing I have shown image-uniting bodies formed of two right triangular prisms, the reflecting surfaces of which opposite the right-angles of the prisms cross each other, as is clearly shown in the drawing. These uniting bodies are designated on the drawing with the numeral 3.

In Fig. 1 I have shown, inserted in the path of the rays between each object-glass and the image-uniting body and in proximity to the latter a further prism 5 having two reflecting surfaces 6, 7 forming a di-hedron and intersecting each other in the edge 8 and a further reflecting surface 9 opposite said di-hedron and parallel to said edge 8 and perpendicular to the plane of the triangle of observation. The surfaces of the prism 5 directed toward the entering rays and those through which the rays leave the prisms are designated 10 and 11 respectively.

The numeral 12 designates the reflecting surfaces of the right triangular elements of the image-uniting body opposite the right-angles of said elements.

The arrangement of optical elements being symmetrical with relation to the axis of the ocular, it is sufficient to contemplate only the operation of one half of the whole combination resulting in the formation of one of the two images of the object which are to be united by suitable adjustment of the instrument in the well known manner. When doing so it is evident that the four reflecting surfaces of such half of the prism combination substantially perpendicular to the plane of the triangle of observation compensate the image reversion produced by the object-glass as far as the reversion of right to left and vice versa is concerned. The effect of the di-hedron 6, 7 is to compensate the object-glass image reversion as far as the reversion from up to down is concerned so that the construction results indeed in the formation of upright-images without lateral reversion.

Fig. 2 shows an instrument with a peculiar form of the image-uniting body which is again designated with the numeral 3. This form of image-uniting body is distinguished from the form shown in Fig. 1 by this that the crossed reflecting surfaces 12 perpendicular to the plane of the triangle of observation are substituted by di-hedron shaped surfaces; in the drawing the two di-hedron forming surfaces are designated 14, whereas the intersecting edge is designated 15. This form of image-uniting body allows to dispense with a further prism, such as prism 5 between the pentaprisms and the image-uniting body. The di-hedron edges 15 however being laterally displaced with relation to the plane of contact of the two elements of the image-uniting body, an object such as the arrow indicated in Fig. 3ᵃ of the drawing would be reproduced in the form of two parts as indicated in Fig. 3ᵇ of the drawing. It is however possible to shift these two parts of the image with relation to each other by suitable adjustment of the pentaprisms 1, the necessary inclination of the surfaces of the pentaprisms directed toward the incoming rays being such as resulting from a slight rotation in opposite directions of said pentaprisms from their normal position with parallel surfaces.

Having now particularly described and ascertained the nature of my said invention and in what manner the same is to be performed, I declare that what I claim is:—

1. In an optical distance-measuring instrument a pair of object-glasses and one ocular, the axis of the ocular substantially parallel to the plane of the triangle of observation, means adapted to emit the rays entering through said two object-glasses through said one ocular, so as to form upright images without lateral reversion, said means comprising an even number of not less than four reflecting surfaces in the path of the rays coming through each object glass, at least one of said reflecting surfaces in each set of reflectors coöperating with the two object glasses, crossing at least one reflector of the other set without intersection, the crossing reflectors being arranged in front of the ocular.

2. In an optical distance-measuring instrument a pair of object-glasses and one ocular, the axis of the ocular substantially parallel to the plane of the triangle of observation, a pair of pentaprisms, each coöperating with one of said object-glasses, an image-uniting body including two elements in the form of right-triangular prisms, the reflecting surfaces of said prisms opposite the right-angles crossing each other.

3. In an optical distance-measuring instrument a pair of object-glasses and one ocular, the axis of the ocular substantially parallel to the plane of the triangle of observation, a pair of pentaprisms arranged so as to offer surfaces to the entering rays which are inclined with relation to each other and each of same coöperating with one of said object-glasses, an image-uniting body including two elements in the form of right-triangular prisms, the reflecting surfaces of said prisms opposite the right-angles crossing each other.

4. In an optical distance-measuring instrument a pair of object-glasses and one ocular, the axis of the ocular substantially parallel to the plane of the triangle of observation, a pair of pentaprisms, each coöperating with one of said object-glasses, an image-uniting body including two elements in the form of right triangular prisms, the reflecting surfaces of said prisms opposite the right-angles crossing each other, a further prism on each side of said uniting-body inserted in the path of the rays coming from said pentaprisms and object-glasses and provided with a di-hedron surface and a further reflecting surface opposite said di-hedron and parallel to the edge of the di-hedron and substantially perpendicular to the plane of the triangle of observation.

In testimony whereof I have signed this specification in the presence of two subscribing witnesses.

FRIEDRICH DUBENHORST.

Witnesses:
  WOLDEMAR HAUPT,
  HENRY HASPER.